United States Patent

Rastogi et al.

Patent Number: 5,946,683
Date of Patent: Aug. 31, 1999

[54] TECHNIQUE FOR EFFECTIVELY INSTANTIATING ATTRIBUTES IN ASSOCIATION RULES

[75] Inventors: Rajeev Rastogi, New Providence; Kyuseok Shim, Bedminster, both of N.J.

[73] Assignee: Lucent Technologies Inc., Murray Hill, N.J.

[21] Appl. No.: 08/977,878

[22] Filed: Nov. 25, 1997

[51] Int. Cl.$^6$ .................................................. G06F 17/30
[52] U.S. Cl. .................................. 707/6; 705/10; 707/1; 707/2; 707/3; 707/5; 707/6
[58] Field of Search .................................. 707/2, 6, 1, 3, 707/5; 705/10

[56] References Cited

U.S. PATENT DOCUMENTS

| | | | |
|---|---|---|---|
| 4,674,066 | 6/1987 | Kucera | 707/5 |
| 5,197,116 | 3/1993 | Katoh et al. | 395/51 |
| 5,321,423 | 6/1994 | Yoshizawa et al. | 345/507 |
| 5,341,474 | 8/1994 | Gelman et al. | 395/200 |
| 5,481,718 | 1/1996 | Ryu et al. | 395/700 |
| 5,664,171 | 9/1997 | Agrawal et al. | 707/2 |
| 5,694,594 | 12/1997 | Chang | 707/6 |
| 5,724,573 | 3/1998 | Agrawal et al. | 707/6 |
| 5,727,129 | 3/1998 | Barrett et al. | 395/12 |
| 5,778,195 | 7/1998 | Whiting et al. | 707/204 |
| 5,794,209 | 8/1998 | Agrawal et al. | 705/10 |
| 5,812,997 | 9/1998 | Morimoto et al. | 707/2 |
| 5,819,266 | 10/1998 | Agrawal et al. | 707/6 |
| 5,832,511 | 11/1998 | Beck et al. | 707/201 |
| 5,842,200 | 11/1998 | Agrawal et al. | 707/1 |

FOREIGN PATENT DOCUMENTS

0332427 9/1989 European Pat. Off. ........................ 9/44

OTHER PUBLICATIONS

Agrawal, Rakesh, "Database Mining: A Performance Perspective", IEEE Transaction on Knowledge and Data Engineering, vol. 5, No. 6. Dec. 1993 pp. 914–925.

Brachman, Ronald, "Mining Business Database", Communications of the ACM, vol. 39, No. 11 Nov. 1996 pp. 42–48.

Cheung, David, "Maintenance of Discovered Association Rules in Large Database: An Incremental Updating Technique", 12th International Conference on Data Engineering, pp. 106–114, Dec. 1996.

Hedberg, Sara, "Parallelism speeds data mining", IEEE Parallel & Distributed Technology, Winter pp. 3–6, Dec. 1995.

Houtsma, Maurice, "Set–Oriented Mining for Association Rules in Relational Databases", 11th International Conference on Data Engineering pp. 25–33, Dec. 1995.

Lee Ho Soo, "Solving N–ary Constraint Labeling Problems Using Incremental Subnetwork Consistency", IEEE pp. 345–351, Aug. 1991.

(List continued on next page.)

*Primary Examiner*—Paul R. Lintz
*Assistant Examiner*—Shahid Alam

[57] ABSTRACT

In a data processing system, association rules are used to determine correlations of attributes of collected data, thereby extracting insightful information therefrom. In solving an optimized association rule problem where multiple instantiations for at least one uninstantiated attribute are required, unlike prior art, not all possible instantiations are considered to realize an optimized set of instantiations. Rather, using inventive pruning techniques, only selected instantiations need to be considered to realize same. In accordance with the invention, instantiations are assigned weights and are subject to pruning in an order dependent upon their weight. The weighted instantiations are tested based on selected criteria to identify, for example, those instantiations, consideration of which for the optimized set would be redundant in view of other instantiations to be considered. The identified instantiations are disregarded to increase the efficiency of determining the optimized set.

55 Claims, 7 Drawing Sheets

OTHER PUBLICATIONS

Lu, Hongjun, "Effective Data Mining Using Neural Networks", IEEE Transactions on Knowledge and Data Engineering, vol. 8, No. 6, Dec. 1996 pp. 957–961.

Rastogi, Rajeev, "Mining Optimized Association Rules with Categorical and Numeric Attributes", Proceedings 14th International Conference on Data Engineering, Feb. 1998, pp. 503–512.

T. Fukuda et al., "Mining Optimized Association Rules for Numeric Attributes," Proceedings of the ACM SIGACT–SIGMOD–SIGART Symposium on Principles of Database Systems, Jun. 1996, pp. 182–191.

R. Agrawal et al., "Fast Algorithm for Mining Association Rules," Proceedings of the 20th VLDB Conference, Sep. 1994.

| DATE | 1 | 2 | 3 | 4 | 5 | 6 | 7 | |
|---|---|---|---|---|---|---|---|---|
| # OF CALLS FROM NY | 170 | 140 | 15 | 35 | 60 | 200 | 180 | ~203 |
| # OF CALLS FROM NY TO FRANCE | 54 | 39 | 5 | 11 | 15 | 104 | 95 | ~205 |
| SUPPORT | 0.085 | 0.07 | 0.008 | 0.018 | 0.03 | 0.1 | 0.09 | ~209 |
| CONFIDENCE | 0.32 | 0.28 | 0.33 | 0.31 | 0.25 | 0.57 | 0.53 | ~211 |

FIG. 3

300 procedure optConfRange(curSet, $i$):
1. if $conf$(optSet) = maxConf ⎯ 301
2.    return [1,0] ⎯ 302
3. $h$ := $k$ − $numInst$(curSet)) ⎯ 303
4. A := $w_2$ ⎯ 304
5. B := ($w_1$ * $conf$(optSet) − w(instArray[$i$]))*$h$ ⎯ 305
6. C := ($conf$(optSet) − $conf$(curSet)) * $sup$(curSet) * $w_1$ * $h$ ⎯ 306
7. [minS, maxS] := $range_1$(A,B,C) ⎯ 307
8. minS := max(minS, 0, minSup−$sup$(curSet),
9.     $\frac{(conf(\text{optSet}) - conf(\text{curSet}))*sup(\text{curSet})}{\text{maxConf} - conf(\text{optSet})}$ ) ⎬ 308
10. maxS := min(maxS, 1−$sup$(curSet), $h$*maxSup,
11.     $\frac{w(\text{instArray}[i]*h}{w_2}$ ) ⎬ 309
12. return [minS, maxS]

FIG. 4

| CONDITION | RANGE$_1$ (A,B,C) | RANGE$_2$ (A,B,C) |
|---|---|---|
| $B^2 - 4*A*C < 0$ | [1,0] | |
| $A = 0, B = 0, C > 0$ | [1,0] | |
| $A = 0, B = 0, C \leq 0$ | [0,1] | |
| $A = 0, B > 0$ | $[0, \frac{-C}{B}]$ | |
| $A = 0, B < 0$ | $[\frac{-C}{B}, 1]$ | |
| $A > 0, B^2 - 4*A*C \geq 0$ | $\left[\frac{-B-\sqrt{B^2-4*A*C}}{2*A}, \frac{-B+\sqrt{B^2-4*A*C}}{2*A}\right]$ | |
| $A < 0, B^2 - 4*A*C = 0$ | [0,1] | |
| $A < 0, B^2 - 4*A*C > 0$ | $\left[0, \frac{-B+\sqrt{B^2-4*A*C}}{2*A}\right]$ | $\left[\frac{-B-\sqrt{B^2-4*A*C}}{2*A}, 1\right]$ |

```
procedure optConfPruneOpt(curSet, curLoc):
1.  for i := curLoc to n do {
2.      [minS,maxS] := optConfRange(curSet, i)         /502
3.      if minS > maxS  ─── 503
4.          break  ─── 504
5.      ES := curSet ∪ {instArray[i]}                    506
6.      if sup(ES) ≥ minSup and conf(ES) > conf(optSet)
7.          optSet := ES  ─── 507
8.      if numInst(ES) < k  ─── 508
9.          optConfPruneOpt(ES, i + 1)  ─── 509
10. }
```

FIG. 6
600 procedure optConfCanPrune($S_1$, $S_2$, $i$):
1. if $numInst(S_1) > numInst(S_2)$
2.    return false
3. [minS$_2$,maxS$_2$] := optConfRange($S_2$, $i$) — 603
4. $h := k - numInst(S_2)$
5. if $sup(S_1) \leq sup(S_2)$ {
6.    $A := 0$ — 606
7.    $B := (conf(S_2) - conf(optSet)) * sup(S_2) + (conf(optSet) -$
8.         $conf(S_1)) * sup(S_1)$
9.    $C := (conf(S_2) - conf(S_1)) * sup(S_1) * sup(S_2) +$
10.         $(conf(optSet) - conf(S_2)) * (sup(S_1) -$
11.                 $sup(S_2)) * sup(S_2)$
12. }
13. else
14.    $A := (sup(S_2) - sup(S_1)) * w_2$ — 612
15.    $B := (conf(S_2) * sup(S_2) - conf(S_1) * sup(S_1)) *$
16.         $w_1 * h + (sup(S_1) - sup(S_2)) * w(instArray[i]) * h$
17.    $C := (conf(S_2) - conf(S_1)) * sup(S_1) * sup(S_2) * w_1 * h$
18. }
19. [minS$_1$,maxS$_1$] := $range_1(A,B,C)$ — 616
20. minS$_1$ := max(minS$_1$,minSup - $sup(S_1)$) — 617
21. if minS$_1$ $\leq$ minS$_2$ and maxS$_2$ $\leq$ maxS$_1$ — 618
22.    return true — 619
23. if $A < 0$ and $B^2 - 4 * A * C > 0${
24.    [minS$_1$,maxS$_1$] := $range_2(A,B,C)$ — 621
25.    minS$_1$ := max(minS$_1$, minSup - $sup(S_1)$) — 622
26.    if minS$_1$ $\leq$ minS$_2$ and maxS$_2$ $\leq$ max S$_1$ — 623
27.      return true
28. }    624
29. return false

FIG. 7
700 procedure optConfPruneInt(intList, curLoc):
1.    newList := $\phi$
2.    foreach $S_1 = \phi$ and $S_1 \in$ intList do { —702
3.       $S_2 := S_1 \cup \{instArray[curLoc]\}$ —703
4.       Append $S_2$ to the end of newList —704
5.       if $sup(S_2) \geq$ minSup and $conf(S_2) > conf$(optSet) —705
6.          optSet := $S_2$ —706
7.    }
8.    if curLoc = $n$
9.       return
10.   Append elements in newList to intList —710
11.   foreach $S_1 \in$ intList (from head to tail) do{ —711
12.       [minS, maxS] := optConfRange($S_1$, curLoc+1) —712
13.       if $numInst(S_1) < k$ and minS $\leq$ maxS —713
14.          foreach $S_2$ preceding $S_1 \in$ intList do { —714
15.             if optConfCanPrune($S_2, S_1$, curLoc+1) = true } —715
16.                Delete $S_1$ from intList —716
17.                break out of inner for loop —717
18.             } —718
19.             else if optConfCanPrune($S_1, S_2$, curLoc+1) = true —719
20.                Delete $S_2$ from intList —720
21.          } —721
22.       else —722
23.          Delete $S_1$ from intList —723
24.    } —724
25.   minWeight := $w_1 * conf$(optSet) + $\dfrac{w_2 * minSup}{k}$ —725
26.   if intList $\neq \phi$ or w(instArray[curLoc+1]) $\geq$ minWeight —726
27.      optConfPruneInt(intList, curLoc+1) —727

FIG. 8
800

```
procedure pruneInstArray
1.     instArray := φ
2.     for z := 2 to n_1 + n_2 do                                          ⟵ 802
3.       for x_1 := 1 to min(n_1, n_1 + n_2 + 1 - z) do                    ⟵ 803
4.         for y_1 := 1 to min(n_2, n_1 + n_2 + 2 - x_1 - z) do            ⟵ 804
5.           for x_2 := max(x_1, x_1 + z - 1 - (n_2 - y_1 + 1))
6.                to min(n_1, x_1 + z - 2) do {                            } 805
7.             y_2 := y_1 + z - 1 - (x_2 - x_1 + 1)                        ⟵ 806
8.             maxConf_1 := maxConf_2 := 0
9.             if x_2 - x_1 > 0
10.              maxConf_1 := max(maxConf[[(x_1,y_1),(x_2 - 1,y_2)]],
11.                               maxConf[[(x_1 + 1,y_1),(x_2,y_2)]])
12.            if y_2 - y_1 > 0
13.              maxConf_2 := max(maxConf[[(x_1,y_1),(x_2, y_2-1)]],
14.                               maxConf[[(x_1, y_1 + 1),(x_2,y_2)]])
15.            maxConf[[(x_1,y_1),(x_2,y_2)]] := max(maxConf_1, maxConf_2)
16.            if sup([(x_1,y_1),(x_2,y_2)]) < minSup{                     ⟵ 813    812
17.              instArray := instArray ∪ {[(x_1,y_1),(x_2,y_2)]}          ⟵ 814
18.              maxConf[[(x_1,y_1),(x_2,y_2)]] := 0                       ⟵ 815
19.            }
20.            else {                                                              818
21.              if maxConf[[(x_1,y_1),(x_2,y_2)]] < conf ([(x_1,y_1),(x_2,y_2)]){
22.                instArray := instArray ∪ {[(x_1,y_1),(x_2,y_2)]}        ⟵ 819
23.                maxConf[[(x_1,y_1),(x_2,y_2)]] := conf([(x_1,y_1),(x_2,y_2)])
24.              }
25.            }                                                                   820
26.          }
27.    Assign weights to instArray                                         ⟵ 824
28.    Sort instArray by weight                                            ⟵ 825
29.    return(instArray)
```

TECHNIQUE FOR EFFECTIVELY INSTANTIATING ATTRIBUTES IN ASSOCIATION RULES

FIELD OF THE INVENTION

The invention relates to data processing systems and methods, and more particularly to systems and methods for managing databases using association rules.

BACKGROUND OF THE INVENTION

In running day-to-day business, many companies use database systems to collect large amounts of data. Data mining techniques have been developed to help these companies to effectively manage the data, and extract insightful information therefrom to improve their business. For example, in a service or retail business, a favorable promotional period may be determined by applying one such data mining technique to sales data collected over time.

Data mining techniques normally use association rules to determine correlations between attributes of the collected data. Each rule has support and confidence measures associated therewith. In accordance with one such technique, a problem of identifying, say, a favorable promotional period may be formulated using an optimized association rule containing at least one uninstantiated attribute, namely, an unknown time interval for the promotional period. In solving the problem, the attribute is instantiated, i.e., the time interval is identified, such that either the support or confidence of the optimized association rule is maximized.

In prior art, application of an optimized association rule to determine an optimal interval is described in T. Fukuda et al., "Mining Optimized Association Rules for Numeric Attributes," *Proceedings of the ACM SIGACT-SIGMOD-SIGART Symposium on Principles of Database Systems*, Jun. 1996, pp. 182–191. However, in this prior art application, only a single optimal interval can be determined, which is inadequate in many applications where multiple favorable intervals are required. The deficiency of the prior art technique may stem from the general belief that fulfillment of an optimized association rule containing an arbitrary number of uninstantiated attributes by exhausting all possible instantiations therefor based on a large amount of data is impractical.

Accordingly, in data mining where an optimized association rule containing a multiplicity of uninstantiated attributes is used, a methodology for effectively instantiating such attributes is needed.

SUMMARY OF THE INVENTION

In accordance with the invention, weights are assigned to instantiations for an uninstantiated attribute in an association rule. Each instantiation is positioned in an array based on the weight assigned thereto. A temporary optimized set of instantiations is identified from the array. This temporary optimized set is recursively updated to obtain the ultimate optimized set, and is used to limit the number of instantiations from the array to be considered in obtaining the ultimate optimized set.

In accordance with an aspect of the invention, where the uninstantiated attribute comprises a categorical attribute which needs to be instantiated by an object or a discrete numeric value, in addition to the temporary optimized set, a first intermediate set and a second different intermediate set of instantiations for the attribute are recursively identified from the array. Assuming that the number of the instantiations in the second intermediate set is at least the number of the first intermediate set, the second intermediate set is disregarded in favor of the first intermediate set based on certain predetermined criteria. Advantageously, the number of instantiations from the array is further limited for the consideration of the ultimate optimized set.

In accordance with another aspect of the invention, where an association rule has one or more uninstantiated numeric attributes which need to be instantiated by a range of numeric values, instantiations are pre-screened before they are inducted into the above array. The pre-screening involves determining the size of a subspace defined by each instantiation for the numeric attributes in an m-dimensional space, where m represents the number of the numeric attributes. For two given instantiations, if the size of a subspace defined by a first instantiation is larger than that defined by a second instantiation, the first instantiation is disregarded in favor of the second instantiation based on other predetermined criteria. Thus, only selected instantiations, as opposed to all possible instantiations, are inducted into the array for the optimized instantiation consideration.

BRIEF DESCRIPTION OF THE DRAWING

In the drawing,

FIG. 3 illustrates a routine for finding a range of values satisfying certain constraints in identifying an optimized confidence set of instantiations in system of FIG. 1;

FIG. 4 is a table for determining the range of values in the routine of FIG. 3;

FIG. 5 illustrates a routine for determining the optimized confidence set of instantiations using the routine of FIG. 3;

FIG. 6 illustrates a routine for pruning intermediate sets of instantiations in identifying an optimized confidence set of instantiations in accordance with the invention;

FIG. 7 illustrates a routine for determining the optimized confidence set of instantiations using the routine of FIG. 6; and FIG. 8 illustrates a routine for screening instantiations of numeric attributes to be considered in a determination of an optimized confidence set of instantiations in accordance with the invention.

DETAILED DESCRIPTION

Figures 1, 2:
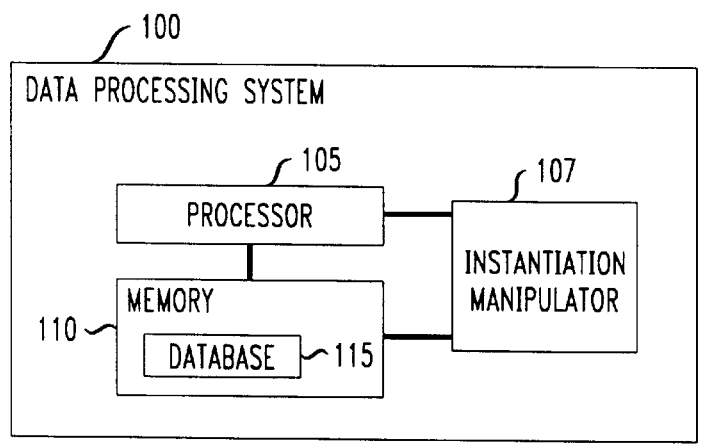
FIG. 1 is a block diagram of a data processing system in accordance with the invention.
FIG. 2 illustrates a segment of a database in the system of FIG. 1.

FIG. 1 illustrates data processing system 100 embodying the principles of the invention. System 100 includes processor 105, instantiation manipulator 107, and memory 110 which contains, inter alia, database 115. Illustratively, system 100 is used by a telecom company providing telecommunications services to manage telephone call data collected in database 115. Memory 110 also contains routines for instructing processor 105 to process the collected data using optimized association rules in accordance with the invention.

In general, association rules provide a mechanism for determining correlations between attributes of collected data. An association rule defines a relation of attributes A's formulated in atomic conditions, either in the form of A=p representing a categorical object or a numeric value, or A $\in [u, v]$ representing a range of numeric values from u to v.

If p is a specified object or value from a pre-defined domain of A, the attribute A=p is said to be instantiated. Otherwise, if p is a variable, the attribute is said to be uninstantiated. Likewise, the attribute A Å[u, v] is instantiated or uninstantiated depending on whether u and v are specified values or variables.

The atomic conditions can be combined to yield a complex condition using operators "∧" and "∨", denoting the logical "AND" and logical "OR" operators, respectively. An association rule R assumes a general form $C_a \rightarrow C_b$, where $C_a$ and $C_b$ are each atomic or complex conditions involving one or more attributes, and in a conjunctive relation. Each rule has support and confidence measures associated therewith.

Let sup(C) represent the support measure of a condition C, which is a ratio of the number of tuples or data records satisfying the condition C to the total number of tuples in the relation. The support of rule R: $C_a \rightarrow C_b$, denoted sup(R), is defined to be the same as the support of $C_a$, i.e., $$sup(R) = sup(C_a) \quad [1]$$

The confidence of rule R, denoted conf(R), is defined to be a ratio of the support of the condition $C_a \wedge C_b$ to that of $C_a$, i.e., $$conf(R) = sup(C_a \wedge C_b)/sup(C_a). \quad [2]$$

FIG. 2 tabulates a segment of database 115 in rows 201, 203 and 205, which summarize certain telephone call data derived from a total number of 2,000 calls handled by the telecom company in a selected week period. Specifically, row 201 enumerates the dates in that week, denoted 1–7. Row 203 enumerates the number of those calls originated from New York on date j, where j=1, 2, ..., 7. Row 205 enumerates the number of those calls made from New York to France on date j. Consider, for example, an association rule R1 representing a relation involving attributes "date" representing a date in the week, "src_city" representing a call origination city, and "dst_country" representing a call destination country. In particular, rule R1 focuses on the relation of the number of telephone calls made from src_city=NY to dst_country=France on a particular date j. In short, $$R1: (\text{date} = j) \wedge (\text{src\_city} = NY) \rightarrow (\text{dst\_country} = \text{France}).$$

Rows 209 and 211 in FIG. 2 respectively enumerate the measures of the support and confidence of rule R1, i.e., sup(R1) and conf(R1). These measures are readily determined by setting above $C_a$=[(date=j) ∧(src_city =NY)], and $C_b$=(dst_country=France) in expressions [1] and [2]. For example, in column 130 where j=7, sup(R1)=sup($C_a$)= number of calls from NY on date 7/total number of calls in the week=180/2,000=0.09. In addition, in column 130, conf(R1)=sup($C_a \wedge {}^{**}C_b$)/sup($C_a$), where sup($C_a \wedge C_b$)= number of calls from NY to France on date 7/total number of calls in the week=95/2000=0.0475. Thus, conf(R1)= 0.0475/0.09=0.53.

Typically, an optimized association rule problem requires an optimal instantiation for an association rule in the general form of $U \wedge C_1 \rightarrow C_2$, where U represents a conjunction of m atomic conditions on m uninstantiated attributes, respectively, where m≧1; and $C_1$ and $C_2$ represent conditions on instantiated attributes. Let $U_i$ represent an instantiation of U, which contains instantiated objects or values of the m respective uninstantiated attributes. Mathematically, $U_i$ can be mapped to a subspace in an m-dimensional space in which each uninstantiated attribute corresponds to one of the m dimensions, and the co-ordinates of the subspace are defined by the instantiated objects or values in $U_i$. Two instantiations $U_i$'s are said to be non-overlapping when the subspaces defined thereby do not intersect.

The aforementioned optimized association rule problem may further be framed as an optimized confidence problem or an optimized support problem. The optimized confidence problem is formulated as follows:

Given k≧1 and an uninstantiated rule $U \wedge C_1 \rightarrow C_2$, determine non-overlapping instantiations $U_1, \ldots, U_q$ of U with q≦k such that sup($\mathfrak{R}$)≧minSup and conf($\mathfrak{R}$) is maximum, where $\mathfrak{R}$ represents the optimized confidence rule $(U_1 \vee \ldots \vee U_q) \wedge C_1 \rightarrow C_2$, and minSup represents a predetermined minimum support of the uninstantiated rule.

On the other hand, the optimized support problem is formulated as follows:

Given k≧1 and an uninstantiated rule $U \wedge C_1 \rightarrow C_2$, determine non-overlapping instantiations $U_1, \ldots, U_q$ of U with q≦k such that conj($\mathfrak{R}$)≧minConf and sup($\mathfrak{R}$) is maximum, where $\mathfrak{R}$ represents the optimized support rule $(U_1 \vee \ldots \vee U_q) \wedge C_1 \rightarrow C_2$, and minConf represents a predetermined minimum confidence of the uninstantiated rule.

Continuing the above example, if periods having a heavy call volume from NY to France are of interest, the uninstantiated rule (date ∈[x, y]) ∧(src_city=NY)→(dst_country=France) may be used, where the attribute "date" is uninstantiated, and x and y are variables respectively representing numeric values of the beginning and end dates of the period, which comprises a range of consecutive days. Thus, such an uninstantiated rule assumes the above general form, with U consisting of the uninstantiated attribute date ∈[x, y], $C_1$ consisting of the instantiated condition src_city=NY, and $C_2$ consisting of the instantiated condition dst_country=France. Assuming that minConf=0.5 and minSup=0.27 in this instance, and at most 2 instantiations of U, i.e., k=2, are of interest here, by instantiating the uninstantiated attribute with selected instantiations $U_1$ and $U_2$ to attain the maximum confidence, the following optimized confidence rule $\mathfrak{R}$1 results:

$$R1: (\text{date} \in [1, 1] \vee \text{date} \in [6, 7]) \wedge$$

$$(\text{src\_city} = NY) \rightarrow (\text{dst\_country} = \text{France}),$$

i.e., $U_1$=date ∈[1, 1] and $U_2$=date ∈[6, 7] in this instance.

$U_1 \vee U_2$ satisfies $\mathfrak{R}$1 as sup($\mathfrak{R}$1)=the number of calls from NY during periods [1, 1] and [6, 7] is at least 2000 * 0.27=540, and conf($\mathfrak{R}$1)=the percentage of those calls to France is 46% which can be shown to be maximum with respect to any single or other pair of periods satisfying the support requirement.

In addition, by instantiating the uninstantiated attribute with selected instantiations $U_3$ and $U_4$ to attain the maximum support, the following optimized support rule $\mathfrak{R}$2 results:

R2: (date ∈ [3, 4] ∨ date ∈ [6, 7]) ∧

(src_city = NY) → (dst_country = France), i.e., $U_3$=date ∈ [3, 4] and $U_4$=date ∈[6, 7] in this instance.

$U_3 \lor U_4$ satisfies ℜ2 as conf(ℜ2)=the percentage of those calls from NY that are destined to France during periods [3, 4] and [6, 7] is at least 50%, and it can be shown that sup (ℜ2)=the number of calls from NY in those two periods is maximum with respect to any single or other pair of periods satisfying the confidence requirement.

Thus, the above optimized association rule problem requires instantiations $U_1, \ldots, U_q$ such that the optimized rule ℜ: $(U_1 \lor \ldots \lor U_q) \land C_1 \to C_2$ satisfies certain predetermined constraints, where ℜ=ℜ1 or ℜ2. However, we have recognized a way of simplifying such a problem by defining an instantiated rule $I_i$ for each instantiation $U_i$ of U, where $I_i$ represents $U_i \land C_1 \to C_2$. In addition, let S be the set $\{I_1, \ldots, I_q\}$, and let sup(S) and conf(S) be defined as follows:

$$sup(S) = sup(I_1) + \ldots + sup(I_q);$$

and $$conf(S) = \frac{sup(I_1)conf(I_1) + \ldots + sup(I_q)conf(I_q)}{sup(I_1) + \ldots + sup(I_q)}.$$

It can be shown that sup(S)=sup(ℜ) and conf(S)=conf(ℜ). It should be pointed out at this juncture that since $I_i$ defines the corresponding $U_i$ based on their relation described above, and vice versa, $I_i$ hereinafter is conveniently referred to as an "instantiation" as well. With this new nomenclature, the term "non-overlapping instantiations" involving $I_i$'s accordingly refers to those $I_i$'s having non-overlapping $U_i$'s corresponding thereto. Mindful of such new nomenclature, we can restate the above optimized confidence problem simply as follows:

Given k, and sup($I_i$) and conf($I_i$) for every instantiation $I_i$, determine an optimized confidence set containing at most k non-overlapping instantiations such that sup(S) ≧minSup and conf(S) is maximized.

Similarly, we can restate the above optimized support problem simply as follows:

Given k, and sup($I_i$) and conf($I_i$) for every instantiation $I_i$, determine an optimized support set containing at most k non-overlapping instantiations such that conj(S) ≧minConf and sup(S) is maximized.

The restatement of the optimized confidence and support problems sets the proper stage for the ensuing description of methodologies for effectively determining optimized support and confidence sets of instantiations in accordance with the invention. Those methodologies involving association rules containing uninstantiated categorical attributes A's formulated in an atomic condition A=p will now be described, where p as mentioned before is a variable representing an object or numeric value, as opposed to a range of numeric values [u, v]. Thus, attribute date=j in the above example is one such categorical attribute. Due to the current restriction that an uninstantiated attribute is categorical, any two arbitrary instantiations for the attribute are always non-overlapping.

A traditional way of solving the optimized confidence and support problems where k instantiations for an uninstantiated attribute, e.g., multiple favorable promotional dates, are sought requires enumeration of all possible sets of 1 up to k instantiations for the attribute, from which the optimized sets are selected. Such resolution is impractical especially when a large amount of data needs to be considered.

In accordance with a pruning technique pursuant to the invention, a set denoted curSet is devised to contain instantiations which are current candidates for an optimized set of instantiations. In solving the optimized confidence problem for example, as soon as the confidence of any set satisfying minSup, which set is obtained by extending curSet, cannot exceed the confidence of the current optimized set, denoted optSet, the extension of curSet is immediately stopped. Otherwise, curSet is further extended, from which new optSet is derived. As curSet represents only a limited search space from which optSet is sought, the prior art requirement of exploring the entire search space by considering of all possible instantiations is obviated.

In order for the inventive pruning technique described below to be effective, it is desirable that a set close to the optimized set is identified as early as possible, which can then be used to eliminate a large number of sub-optimal sets. It may seem logical that in solving the optimized confidence problem, considering those instantiations with high confidences first may cause the search to converge on the optimized set rapidly. However, this may not be the case since the support of the optimized confidence set has to be at least minSup. For a large minimum support, it may be better to explore instantiations in decreasing order by support. Thus, the determination of the order in which instantiations are considered in a search is a non-trivial problem. In solving this problem, instantiation manipulator 107 in accordance with the invention assigns, to each possible instantiation I initially generated by processor 105 for the uninstantiated attribute, a weight w(I) which is defined as follows:

$$w(I) = w_1 * conf(I) + w_2 * sup(I),$$

where $w_1$ and $w_2$ are real constants greater than zero. Thus, the weight of an instantiation w(I) is the weighted sum of the confidence and support of the instantiation. Manipulator 107 then arranges the weighted instantiations in an array denoted instArray in decreasing order by weight so that instantiations having higher weights are considered first in the search for the optimized set of instantiations. By varying the values of $w_1$ and $w_2$, the strategy for identifying curSet containing instantiations to be considered in the search can accordingly be varied. Manipulator 107 provides instArray to memory 110 for further processing by processor 105 in a manner to be described. In addition, parameters maxConf and maxSup are identified and stored in memory 110, which denote maximum confidence and maximum support of all the instantiations in instArray, respectively. Thus, in the above example where the uninstantiated attribute date=j is of interest, by referring to rows 209 and 211 in FIG. 2, maxConf=0.57 and maxSup=0.1.

For example, in identifying the optimized confidence set including at most k instantiations, the aforementioned curSet is only extended with a set (S+) of instantiations taken from instArray one by one starting from its $i^{th}$ instantiation (instArray[i]), where i=1, 2 ... n; n denotes the total number of instantiations in instArray. The extension of curSet is stopped as soon as it is determined that S+ no longer satisfies (a) sup(curSet ∪ S+)≧minSup, and (b) conf(curSet ∪ S+)≧conf(optSet), where "∪" represents a standard set "UNION" operator.

Let s and c denote Sup(S+) and conf(S+), respectively, and h=k−the number of instantiations in curSet. Constraints on s that must be satisfied by any set S+ that can be used to extend curSet such that conditions (a) and (b) hold are defined as follows:

The requirement of condition (b) results in the following constraint:

$$\frac{c*s + conf(curSet)*sup(curSet)}{s + (curSet)} \geq conf(optSet),$$

which can be rewritten as:

$$c \geq conf(optSet) + \frac{(conf(optSet) - conf(curSet)) * sup(curSet)}{s}. \quad [\text{I}]$$

In addition, curSet $\cup$ S+ must satisfy the minimum support, and S+ is allowed to include at most h instantiations, thus resulting in the following two constraints:

$$minSup \leq s + sup(curSet) \leq 1; \quad [\text{II}]$$

and $$0 \leq s \leq h * maxSup \quad [\text{III}]$$

Since the confidence of set S+ can be at most maxConf, i.e., $c \leq maxConf$. Combining this constraint with constraint [I] results in the following constraint which, if satisfied by s, ensures that there exists a c that does not exceed maxConf and, at the same time, causes the confidence of curSet $\cup$ S+ to be at least conf(optSet):

$$\frac{sup(curSet) * (conf(optSet) - conf(curSet))}{maxConf - conf(optSet)} \leq s. \quad [\text{IV}]$$

Because of the fact that the instantiations are sorted in decreasing order by weight and only instArray[i] and the instantiations following it in instArray are used to extend curSet, S+ contains only instantiations with weights at most w(insArray[i]). In addition, S+ can contain at most h instantiations as mentioned before. As a result, the following constraint on s and c emerges:

$$w_1 * c + \frac{w_2 * s}{h} \leq w(instArray[i]). \quad [\text{Va}]$$

By rearranging the terms in constraint [Va], the following constraint is realized:

$$c \leq \frac{w(instArray[i]) * h - w_2 * s}{h * w_1}. \quad [\text{Vb}]$$

Since c, the confidence of S+, must be at least 0, substituting 0 for c in constraint [Vb] results in the following constraint that prevents s from getting so large that c would have to become negative to satisfy the constraint.

$$s \leq \frac{w(instArray[i]) * h}{w_2}. \quad [6]$$

Finally, constraints [I] and [Vb] can be combined to form the following constraint to limit s to values for which a corresponding value of c can be determined such that the confidence of curSet $\cup$ S+ does not fall below conf(optSet), and the weight of the instantiations in S+ do not exceed w(instArray[i]):

$$\frac{w(instArray[i]) * h - w_2 * s}{w_1 * h} \geq \quad [\text{VII}]$$

$$conf(optSet) + \frac{(conf(optSet) - conf(curSet)) * sup(curSet)}{s}.$$

FIG. 3 illustrates routine 300 for extending curSet with instantiations in instArray subject to constraints [II] through [VII]. Routine 300 is stored in memory 110 and includes instructions for processor 105 to execute. Routine 300 including procedure optConfRange is illustrated using conventional code. In accordance with this procedure, only if there exists a value of s satisfying constraints [II] through [VII], would curSet be extended. To that end, a range [minS, maxS] is computed, in which s satisfies the above constraints, where minS and maxS represent the minimum value and the maximum value of s in that range, respectively. If there does not exist an s that satisfies constraints [II]–[VII], then a range for which minS>maxS, e.g., [minS, maxS]=[1, 0] is returned for convenience. Thus, if the range [minS, maxS], with minS>maxS, is returned by procedure optConfRange, the extension of curSet is stopped.

Routine 300 takes as inputs curSet and index i for instArray[i] representing the instantiation being considered to extend curSet. The variable optSet is used to keep track of the optimized set of instantiations identified in routine 500 described below. Specifically, in step 301, if current optSet has the maximum possible confidence, curSet does not need to be extended. As such, [minS, maxS]=[1, 0] is returned, as indicated in step 302. Otherwise, in steps 303–307, the range [minS, maxS] in which s satisfies constraint [VII] is computed. This computation involves solving a quadratic inequality in s in the form of $A*s^2+B*s+C \leq 0$, where $A=w_2$, $B=(w_1 * conf(optSet)-w(instArray[i]))* h$, and $C=(conf(optSet)-conf(curSet)) * sup(curSet) * w_1 * h$. The ranges of values of s limited by [0, 1] that satisfy $A*s^2+B*s+C \leq 0$ based on different values of A, B and C are provided in FIG. 4, and are denoted $range_1(A, B, C)$ and $range_2(A, B, C)$ in columns 401 and 403, respectively. For most cases, only one range of values for s exists. However, for certain values of A, B, and C such as those listed in row 405, two distinct ranges from $range_1(A, B, C)$ and $range_2(A, B, C)$ are possible, although only the range from $range_1(A, B, C)$ are used in routine 300. In addition, for some values of A, B and C such as those listed in rows 407 and 409, there does not exist an s that satisfies the quadratic inequality. In such cases, $range_1(A, B, C)$ is assigned [1, 0] for convenience. For cases in which the quadratic inequality is satisfied for all values of s, e.g., A=0, B=0 and C$\leq$0, $range_1(A, B, C)$ is assigned [0, 1].

Referring back to FIG. 3, to meet constraints [II] through [IV] in addition to constraint [VII], minS in step 308 is set to the following:

$$minS = \max\biggl( minS, 0, minSup - Sup(curSet),$$

$$\frac{(conf(optSet) - conf(curSet)) * sup(curSet)}{maxConf - conf(optSet)} \biggr),$$

where max(a1, a2, . . . ) is a standard function which selects the largest value of the arguments "a1," "a2," . . . .

Similarly, to further meet constraints [II], [III] and [VI], maxS in step 309 is set to the following:

$$maxS = \min\left(maxS, 1 - sup(curSet), h*maxSup, \frac{w(instArray[i])*h}{w_2}\right),$$

where min(b1, b2, ...) is a standard function which selects the smallest value of the arguments "b1," "b2,". . . .

FIG. 5 illustrates routine 500 for identifying the optimized confidence set of at most k instantiations, e.g., multiple favorable promotional dates including date=$j_1$, date=$j_2$, . . . up to date=$j_k$. Routine 500 comprising procedure optConfPurneOpt is stored in memory 110, and includes instructions executable by processor 105. This procedure includes arguments curSet, and curLoc representing the index of the first instantiation in instArray to be considered for extending curSet. Initially, curSet=φ and curLoc=0. Specifically, in step 502, procedure optConfRange described above is invoked to determine whether curSet can be extended with any S+ including instantiations from instArray to yield the optimized confidence set. To that end, the range [minS, maxS] returned by procedure optConfRange is checked by comparing minS with maxS. If minS>maxS, extension of curSet is stopped, as indicated in steps 503 and 504. In step 505, the extended set is stored as ES. The aforementioned variable optSet is used to keep track of the optimized set of instantiations encountered during the execution of routine 500. In steps 506 and 507, optSet is assigned with ES if the latter has a support at least equal to minSup, and a greater confidence than the current optimized set. In steps 508 and 509, procedure optConfPruneOpt enumerates all possible subsets of size k or less by recursively invoking itself, subject, however, to the condition set forth in steps 502–504 described above. After routine 500 is executed, optSet in this instance contains the optimized confidence set of up to k instantiations as required.

The above methodology for identifying the optimized confidence set is similarly applicable to obtaining the optimized support set. In identifying the optimized support set, constraints [I]–[VII] on s remain the same except that conf(optSet) and minSup need to be replaced by minConf and sup(optSet), respectively. This stems from the requirement that the confidence of curSet ∪ S+ be at least minConf and the support of curSet ∪ S+ cannot be less than that of optSet. Thus, by replacing conf(optSet) and minSup with minConf and sup(optSet) respectively in all occurrences in procedures optConfRange and optConfPruneOpt described above, the corresponding procedures optSupRange and optSupPruneOpt applicable to the derivation of the optimized support set engender. Accordingly, procedure optSupRange is invoked in procedure optSupPruneOpt.

The above-described pruning technique relies on the current optimized set of instantiations to reduce the search space. A second pruning technique will now be described, whereby a list of intermediate sets of instantiations is maintained and pruned. In accordance with the invention, not only the current optimized set but also the intermediate sets are used for pruning the search space.

For example, in identifying the optimized confidence set of instantiations using a routine described below, the routine keeps track of (a) the current optimized set, and (b) intermediate sets each including a different subset of instantiations having the highest weight from instArray, where the subset is identified in the course of obtaining the current optimized set. We have recognized that these intermediate sets may be further extended with the remaining instantiations in instArray to potentially yield the optimized set. As such, the intermediate sets are each extended with the instantiation having the next highest weight in instArray, thereby generating new intermediate sets. If any of the new intermediate sets is better than the current optimized set, optSet is replaced thereby. In addition, since instantiations in instArray are stored in decreasing order by weight, procedure optConfRange in routine 300 can be used to eliminate those intermediate sets which are not destined to become the optimized set.

Consider two intermediate sets $S_1$ and $S_2$ for which numInst($S_1$)≦numInst($S_2$), and for each set S++ of instantiations selected to extend $S_2$, sup($S_1$ ∪ S++)≧minSup and conf($S_1$ ∪ S++)≧conf($S_2$ ∪ S++). Because of the assumption that numInst($S_1$)≦numInst($S_2$), $S_1$ ∪ S++ contains no more instantiations than $S_2$ ∪ S++. Since any two arbitrary instantiations are non-overlapping due to the consideration of only uninstantiated categorical attributes here, for some set S++ if $S_2$ ∪ S++ could become the optimized confidence set, $S_1$ ∪ S++ could become the optimized set as well. That is, deleting $S_2$ from the list of intermediate sets does not affect result of the optimized confidence set identification process, and actually improves its efficiency.

Specifically, procedure optConfRange in routine 300 can be used to determine a first range of supports for an S++ which can be used to extend $S_2$ to yield a set having a support equal to at least minSup and confidence as good as the current optimized set. Let s denote sup[S++], c denote conf([S++], h=k−numInst($S_2$), and i be the index of the instantiation instArray[i] to be considered for extending the intermediate sets. Based on above constraints [I] and [Vb], the following constraint on c emerges:

$$conf(optSet) + \frac{conf(optSet) - conf(S_2))*sup(S_2)}{s} \leq \qquad \text{[VIII]}$$

$$c \leq \frac{w(instArray[i])*h - w_2*s}{h*w_1}.$$

Suppose a second range of supports can be determined for another S++ used to extend $S_1$ to yield a set whose support is at least minSup, and for all values of c satisfying constraint [VIII], the confidence of $S_1$ ∪ S++ is at least that of $S_2$ ∪ S++. If the first range of supports is contained within the second range of supports, it follows from the above that each set S++ which can be used to extend $S_2$ to yield an optimized set can also be used to extend $S_1$ to yield a set having a support at least minSup and confidence at least that of $S_2$ ∪ S++. In that case, intermediate set $S_2$ can be discarded in favor of $S_1$ in accordance with the invention. In determining the second range of supports, the above requirement that the support of $S_1$ ∪ S++ be at least minSup translates to the following constraint on s:

$$minSup \leq sup(S_1)+s \qquad \text{[IX]}$$

In addition, the requirement that for all values of c satisfying constraint [VIII], conf($S_1$ ∪ S++)≧conf($S_2$ ∪ S++) translates to the following constraint on s for all such c values:

$$\frac{sup(S_1)*conf(S_1)+s*c}{sup(S1)+s} \geq \frac{sup(S_2)*conf(S_2)+s*c)}{sup(S_2)+s}. \qquad \text{[X]}$$

It can be shown that if sup($S_1$)≦sup($S_2$), then for a given value of s, constraint [X] is satisfied for all values of c if it is satisfied with c=$c_{min}$, where $c_{min}$ equals the inequality portion on the right of the first "≦" in constraint [VIII]. Similarly, it can be shown that if sup($S_1$)>sup($S_2$), then for a given value of s, constraint [X] is satisfied for all values of c if it is satisfied with c=$c_{max}$, where $c_{max}$ equals the inequality portion on the left of the second "≦" in constraint [VIII]. This being so, the above second range of supports for S++ includes those s values which satisfy constraint (IX) and, either constraint (X) with c=$c_{min}$ if sup($S_1$)≦sup($S_2$) or constraint (X) with c=$c_{max}$ otherwise.

FIG. 6 illustrates routine 600 including procedure optConfCanPrune for determining whether of intermediate sets $S_1$ and $S_2$ to be extended with instantiation instArray[i], $S_2$ can be pruned in favor of $S_1$. This procedure returns "true" if $S_2$ can indeed be pruned based on the analysis described above. Otherwise, it returns "false". For example, in step 603, as mentioned before procedure optConfRange in routine 300 is invoked to provide [min$S_2$, max$S_2$] representing the range of s for instArray[i] which may be used to extend $S_2$, where min$S_2$ and max$S_2$ respectively denote the minimum and maximum s values in that range. The determination of the range of s for instArray[i] which may be used to extend $S_1$ subject to constraint [X] requires solving two inequalities in the form of $A*s^2+B*s+C \leq 0$, corresponding to sup($S_1$)≦sup($S_2$) with c=$c_{min}$ and sup($S_1$)>sup($S_2$) with c=$c_{max}$, respectively. The values of A, B and C of the two inequalities are specified in steps 606–608 and steps 612–614, respectively. The range satisfying the inequalities having specific values of A, B and C is determined using the table in FIG. 4 described before. The range thus determined is stored as [min$S_1$, max$S_1$] in step 616, where min$S_1$ and max$S_1$ respectively denote the minimum and maximum s values in that range. To additionally satisfy constraint [IX], min$S_1$ in step 617 is set to the following:

min$S_1$=max(min$S_1$, minSup-sup($S_1$)).

If [min$S_2$, max$S_2$] is contained in [min$S_1$, max$S_1$], i.e., min$S_1$≦min$S_2$ and max $S_2$≦max$S_1$, max$S_2$ can be pruned as discussed before, as indicated in steps 618 and 619.

Since when sup($S_1$)>sup($S_2$), the A, B and C values may satisfy the condition set forth in row 405 of FIG. 4, the range [min$S_1$, max$S_1$] may take on range$_2$(A, B, C) in addition to range$_1$(A, B, C). As such, steps 621–624 are repetitive of steps 616–619 for the case [min$S_1$, max $S_1$]=range$_2$(A, B, C).

FIG. 7 illustrates routine 700 comprising procedure optConfPruneInt for computing the optimized confidence set, taking advantage of the pruning of any intermediate sets in procedure optConfCanPrune just described. As shown in FIG. 7, procedure optConfPruneInt accepts as input parameters "intList" consisting of a list of intermediate sets for the first (curLoc−1) instantiations in instArray, and "curLoc" representing the index of the instantiation in instArray to be considered for extending the intermediate sets in intList. The procedure is initially invoked with intList=φ and curLoc=1, and it recursively invokes itself with successively increasing the value of curLoc.

Specifically, in steps 702–704, every set in intList is extended with instArray[curLoc] and a new list "newList" is formed to contain the extended set. If an extended set in newList is found in step 705 to have support at least minSup and higher confidence than that of the currently stored optimized set optSet, the latter is set to the extended set, as indicated in step 706. In steps 710–724, those intermediate sets that cannot be extended further to result in the optimized set are deleted from intList. Such intermediate sets include those sets already containing k instantiations plus those other sets for which above procedure optConfRange returns an empty range, i.e., minS>maxS. In addition, as discussed before, of any two intermediate sets $S_1$ and $S_2$ in intList that can be extended to potentially yield an optimized set, one can be pruned if calling of above procedure optConfCan-Prune on $S_1$ and $S_2$ returns "true", as indicated in steps 714–721. In steps 725–727, an exit condition is instituted to terminate routine 700 early even though the value of curLoc may be smaller than n. The exit condition is met when there is no intermediate set to expand, i.e., intList=φ, and the weight of instArray[curLoc+1] is less than minweight representing the minimum weight required to generate the optimized set, which is specified as follows in accordance with above constraint [Va]:

$$\text{minWeight} = w_1 * conf(optSet) + \frac{w_2 * minSup}{k}.$$

The above methodology for identifying the optimized confidence set based on the alternative intermediate set pruning technique is similarly applicable to obtaining the optimized support set. In an optimized support set problem where intermediate set $S_1$ has fewer instantiations than $S_2$, and each set S++ which can be used to extend $S_2$ to yield an optimized set can also be used to extend $S_1$ to yield a set having a confidence at least minSup and support at least that of $S_2 \cup$ S++, intermediate set $S_2$ can be discarded in favor of $S_1$ in accordance with the invention. To that end, a first range of supports for set S++ which can be used to extend $S_2$ is similarly obtained using procedure optSupRange described above. In addition, the confidence of S++ is required to meet the following constraint, derived form constraint [I] by replacing conf(optset) with minConf:

$$c \geq minConf + \frac{minconf - conf(S_2)*(S_2)}{s}. \qquad [XI]$$

A second range of supports for S++ is computed such that sup($S_1 \cup$ S++)≧sup($S_2 \cup$ S++) and, for all c satisfying constraint [XI], conf($S_1 \cup$ S++)≧minConf. If the first range of supports is contained within the second range of supports, $S_2$ can be pruned as mentioned before. The second range of supports consists of all values of s which satisfy the following two constraints, wherein all values of c satisfying constraint [XI]:

$$\sup(S_1)+s \geq \sup(S_2)+s; \qquad [XII]$$

and $$\frac{\sup(S_1)*conf(S_1)+c*s}{\sup(S_1)+s} \geq minConf. \qquad [XIII]$$

For a given s, constraint [XIII] is satisfied for all c≧$c_{min}$ if it is satisfied with c=$c_{min}$, where $c_{min}$ equals the inequality portion on the right of "≧" in constraint [XI]. As such, the second range of supports can be easily determined, which consists of all those s values satisfying constraints [XII] and [XIII], with c=$c_{min}$. Since based on the disclosure heretofore, a person skilled in the art is readily able to derive procedures optSupCanPrune and optSupPruneInt corresponding to above-described procedures optConfCanPrune and optConfPruneInt, respectively, the description of the former procedures is thus omitted here.

As mentioned before, the above inventive pruning techniques are applicable to solving the optimized association rule problems involving uninstantiated categorical attributes only. Determination of the optimized sets of instantiations for an association rule containing uninstantiated numeric attributes will now be described. A numeric attribute A in an association rule is one expressed in the form A∈[u, v], such as date ∈ [x, y] in the above example. Thus, the numeric attribute needs to be instantiated with an interval or a range of values, as opposed to an object or a discrete value in the case of a categorical attribute. Mathematically, each instantiation for m numeric attributes in an association rule corresponds to a subspace in an m-dimensional space while each instantiation for m categorical attributes corresponds to a point in the m-dimensional space.

An optimized association rule problem involving uninstantiated numeric attributes is much more complex than its counterpart involving uninstantiated categorical attributes only. This principally stems from the fact that any two instantiations for a categorical attribute do not overlap as each instantiation corresponds to a point, while two instantiations for a numeric attribute may overlap as each instantiation here corresponds to a subspace. As a result, for example, the above intermediate set pruning technique is not applicable to the uninstantiated numeric attribute problem at hand.

In addition, the number of instantiations for numeric attributes to be considered in an optimized association rule problem increases significantly with the number of the attributes involved. To tackle this problem, instantiations are pre-screened by instantiation manipulator 107 in accordance with the invention before they are inducted into instArray. Without loss of generality, the determination of the optimized confidence set for two uninstantiated numeric attributes, e.g., two favorable promotional periods, utilizing the inventive pre-screening technique will now be described.

Each instantiation $[(x_1, y_1), (x_2, y_2)]$ for the two numeric attributes in question corresponds to a rectangle in a 2-dimensional space which is bounded by $x_1$ and $x_2$ on the x axis, and by $y_1$ and $y_2$ on the y axis. The size of the instantiation is defined to be the sum of the lengths of the rectangle along the two axes. Furthermore, these lengths are defined to be $|x_2-x_1|+1$ and $|y_2-y_1|+1$ along the x and y axes, respectively. Thus, for example, the size of an instantiation $[(1, 1), (3, 4)]$ is 7 as the rectangle defined thereby has a length of 3 along the x axis and a length of 4 along the y axis. It can be shown that an instantiation $I_1=[(x_1, y_1), (x_2, y_2)]$ of size z can be pruned in favor of instantiations $I_2$ having a size z−1 or less, provided that they are contained in $I_1$ and have a support at least minSup and a confidence at least that of $I_1$'s.

FIG. 8 illustrates routine 800 for inducting instantiations into instArray in accordance with the invention. Routine 800 comprising procedure pruneInstArray includes instructions executable by instantiation manipulator 107. Routine 800 is an iterative process wherein instantiations of increasing size are considered in successive iterations. During each iteration, maximum confidence values for instantiations of size z−1 determined during the previous iteration are used to prune the current enumerated instantiations of size z, and to determine the current maximum confidence.

The smallest and largest sizes of the instantiations to be pruned are 2 and $n_1+n_2$, respectively, where $n_1$ and $n_2$ represent the upper bounds on $x_1$ and $y_1$, respectively. Thus, using the first for-loop in step 802 in FIG. 8, with size z varying from 2 to $n_1+n_2$, instantiations of size z are generated for each point $(x_1, y_1)$ serving as the lower coordinate of the instantiations.

The two for-loops in respective steps 803 and 804 determine the point $(x_1, y_1)$ with which at least one instantiation of size z can be generated. Since the minimum values of $x_1$ and $y_1$ are 1, only values of 1 or higher for $x_1$ and $y_1$ are considered in those for-loops. If an instantiation having its lower x coordinate=$x_1$ and a size z exists, the largest instantiation having its lower x coordinate between x=1 and x=$x_1$, and a size at least z must exist. Thus, by requiring that the size of the largest instantiation $[(x_1, 1), (n_1, n_2)]$ be at least z, the following condition results:

$$(n_1-x_1+1)+(n_2-1+1) \geq z$$

By rearranging the terms of the condition, the condition $x_1 \leq (n_1+n_2)-z+1$ comes into being. In addition, $x_1$ can be at most $n_1$. As a result, $x_1$ can vary from 1 to $\min(n_1, n_1+n_2+1-z)$, as indicated in the for-loop in step 803. Similarly, for a given $x_1$, by requiring the size of the largest instantiation $[(x_1, y_1), (n_1, n_2)]$ to be at least z, the following condition on $y_1$ results:

$$n_1+n_2+2-x_1-z \geq y_1$$

In addition, $y_1$ can be at most $n_2$. As a result, $y_1$ can vary from 1 to $\min(n_2, n_1+n_2+2-x_1-z)$, as indicated in the for-loop in step 804.

Once the values for $x_1$ and $y_1$ have been determined, values for $x_2$ and $y_2$ are enumerated such that the resulting instantiations are of size z. The lower and upper limits on $x_2$ can be derived similarly to those for $x_1$ and $y_1$ described above, and are found to be $\max(x_1, x_1+z-1(n_2-y_1+1))$ and $\min(n_1, x_1+z-2)$, respectively, as indicated in the for-loop in step 805. Once the values for $x_1$, $y_1$ and $x_2$ are identified, the value of $y_2$ is determined to be $y_1+z-1-(x_2-x_1+1)$ as indicated in the for-loop in step 806 such that the instantiation $[(x_1, y_1), (x_2, y_2)]$ is of size z.

If the support of the instantiation $[(x_1, y_1), (x_2, y_2)]$ of size z is determined to be less than minSup in step 813, the instantiation is added to instArray, as indicated in step 814. Otherwise, the instantiation $[(x_1, y_1), (x_2, y_2)]$ of size z is added to instArray only if its confidence is greater than that of each instantiation of size z−1 which has a support at least minSup and which is contained in the instantiation $[(x_1, y_1), (x_2, y_2)]$. The instantiation of size z−1 is said to be contained in the instantiation $[(x_1, y_1), (x_2, y_2)]$ when the rectangle representing the former is within the rectangle representing the latter in the 2-dimensional space. In any event, there are only four instantiations of size z−1 which are contained in the instantiation $[(x_1, y_1), (x_2, y_2)]$, namely, $[(x_1, y_1), (x_2-1, y_2)]$, $[(x_1, y_1), (x_2, y_2-1)]$, $[(x_1, y_1+1), (x_2, y_2)]$. The variable $\max\text{Conf}[[(x_1, y_1), (x_2, y_2)]]$ in step 812 is used to store the greatest of the confidences of any of these four instantiations whose support is at least minSup. Such confidences were generated in the previous iteration concerning instantiations of size z−1. Thus, for an instantiation $[(x_1, y_1), (x_2, y_2)]$ whose support is less than minSup, it is pruned and thus not inducted into instArray unless its confidence is greater than $\max\text{Conf}[[(x_1, y_1), (x_2, y_2)]]$, as indicated in steps 818 and 819. To ensure that only confidences of the instantiations of size z whose support is at least minSup are considered in the maxConf determination in the next iteration, $\max\text{Conf}[[(x_1, y_1), (x_2, y_2)]]$ is set to conf $([(x_1, y_1), (x_2, y_2)])$ if $\sup[(x_1, y_1), (x_2, y_2)]$ is at least minSup, as indicated in step 820. Otherwise, if $\sup[(x_1, y_1), (x_2, y_2)]$ is greater than minSup, $\max\text{Conf}[[(x_1, y_1), (x_2, y_2)]]$ is set to zero, as indicated in step 815. After all the eligible instantiations are inducted into instArray, in step 824 each instantiation is assigned a weight in a manner described before. The weighted instantiations are then sorted in decreasing order by weight in step 825.

Procedure optConfPruneOpt in above routine 500 can be slightly modified to compute the required optimized confidence set based on instArray obtained from procedure pruneInstArray just described. Since the optimized set can contain only non-overlapping instantiations, curSet in routine 500 should not be extended with an overlapping instantiation from instArray. To that end, let's make up a function overlap($\overline{S}$, I) for a set of instantiations $\overline{S}$ and an instantiation I, which returns "true" if the rectangle representing some instantiation in $\overline{S}$ and the rectangle representing I overlap. Thus, the modified procedure optConfPruneOpt in question includes an inserted step "if overlap(curSet, instArray[i])= false" between steps 501 and 502 in routine 500, with the body of this if-statement covering steps 502–507.

When association rules contain both uninstantiated categorical and numeric attributes, the modified procedure optConfPruneOpt for numeric attributes can still be used. Instantiations in instArray are obtained by instantiating each categorical attribute with an object or a numeric value in its domain while each numeric attribute is instantiated with an interval in its domain. Furthermore, for association rules containing, for example, two uninstantiated numeric attributes and an arbitrary number of uninstantiated categorical attributes, procedure pruneInstArray can still be used to induct instantiations into instArray. In that case, the set of instantiations is first partitioned such that each instantiation in a partition has the respective categorical attributes instantiated identically to every other instantiation in the partition. Procedure pruneInstArray is then applied to each partition, independent of the remaining partitions, and enumerates all the rectangles in the partition in increasing size which represent the instantiations of the numeric attributes only.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, data processing system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. A system for processing data based on an association rule including at least one uninstantiated attribute of the data comprising:

a data manipulator for assigning weights to a plurality of instantiations for the uninstantiated attribute, each weight being assigned to a respective one of the plurality of instantiations, each instantiation being positioned in an array based on the weight assigned thereto; and a processor for selecting a subset of instantiations in the array.

2. The system of claim 1 further comprising means for computing a confidence measure of each of the plurality of instantiations, wherein the weight assigned to the instantiation is a function of at least the confidence measure of the instantiation.

3. The system of claim 1 further comprising means for computing a support measure of each of the plurality of instantiations, wherein the weight assigned to the instantiation is a function of at least the support measure of the instantiation.

4. The system of claim 1 wherein the instantiations are positioned in the array in decreasing order by weight.

5. The system of claim 1 wherein the uninstantiated attribute comprises a categorical attribute.

6. The system of claim 1 further comprising means for maintaining a set of instantiations from the array, wherein the processor selects the subset of instantiations from the set of instantiations, the set of instantiations being extended to include at least one additional instantiation in the array based on at least one value which is a function of the selected subset of instantiations.

7. The system of claim 6 further comprising means for computing a confidence measure of the selected subset of instantiations, wherein the value includes the confidence measure.

8. The system of claim 6 further comprising means for computing a support measure of the selected subset of instantiations, wherein the value includes the support measure.

9. The system of claim 1 further comprising means for computing a confidence measure of a given subset of instantiations from the array, wherein the number of the instantiations in the selected subset is at most k, where k is greater than zero, the selected subset of instantiations having a relatively high confidence measure with respect to that of any other subset having at most k instantiations from the array.

10. The system of claim 9 further comprising means for computing a support measure of the selected subset of instantiations, wherein the support measure is at least a predetermined value greater than zero.

11. The system of claim 1 further comprising means for computing a support measure of a given subset of instantiations from the array, wherein the number of the instantiations in the selected subset is at most k, where k is greater than zero, the selected subset of instantiations having a relatively high support measure with respect to that of any other subset having at most k instantiations from the array.

12. The system of claim 11 further comprising means for computing a confidence measure of the selected subset of instantiations, wherein the confidence measure is at least a predetermined value greater than zero.

13. The system of claim 12 further comprising a data manipulator for assigning a weight to the second instantiation when the first instantiation is disregarded.

14. The system of claim 13 wherein the second instantiation is positioned in an array based on the weight assigned thereto.

15. The system of claim 1 wherein the processor includes the data manipulator.

16. A system for processing data based on an association rule including at least one uninstantiated attribute of the data comprising:

means for assigning weights to a plurality of instantiations for the uninstantiated attribute, each weight being assigned to a respective one of the plurality of instantiations;

means for positioning each instantiation in an array based on the weight assigned thereto; and means for selecting a subset of instantiations in the array.

17. Software including machine readable instructions stored in a tangible medium for performing a process for processing data based on an association rule which includes at least one uninstantiated attribute of the data, the process comprising the steps of:

assigning weights to a plurality of instantiations for the uninstantiated attribute, each weight being assigned to a respective one of the plurality of instantiations;

positioning each instantiation in an array based on the weight assigned thereto; and selecting a subset of instantiations in the array.

18. A system for processing data based on an association rule including at least one uninstantiated attribute of the data, a set of instantiations being selected for the uninstantiated attribute based on the data, comprising:

a mechanism for deriving from the data at least a first intermediate set and a second different intermediate set of instantiations for the uninstantiated attribute, the number of instantiations in the second intermediate set being at least the number of instantiations in the first intermediate set; and a processor for determining whether to disregard the second intermediate set, the first intermediate set being a candidate for the selected set when the second intermediate set is disregarded.

19. The system of claim 18 wherein the uninstantiated attribute comprises a categorical attribute.

20. The system of claim 18 further comprising means for computing a confidence measure of a given set of instantiations, wherein the selected set of instantiations is required to have a confidence measure at least as high as that of the first intermediate set and that of the second intermediate set, the processor determining to disregard the second intermediate set based on at least whether the confidence measure of the first intermediate set is at least that of the second intermediate set.

21. The system of claim 20 further comprising means for computing a support measure of the selected set of instantiations, wherein the support measure is at least a predetermined value greater than zero.

22. The system of claim 18 further comprising means for computing a support measure of a given set of instantiations, wherein the selected set of instantiations is required to have a support measure at least as high as that of the first intermediate set and that of the second intermediate set, the processor determining to disregard the second intermediate set based on at least whether the support measure of the first intermediate set is at least that of the second intermediate set.

23. The system of claim 22 further comprising means for computing a confidence measure of the selected set of instantiations, wherein the confidence measure is at least a predetermined value greater than zero.

24. A system for processing data based on an association rule including at least one uninstantiated attribute of the data, an instantiation being selected for the at least one uninstantiated attribute based on the data, comprising:

a mechanism for determining a size of subspace defined by an instantiation for the at least one uninstantiated attribute, the subspace being disposed in an m-dimensional space, where m is not greater than the number of the at least one uninstantiated attribute, the size of a first subspace defined by a first instantiation for the at least one uninstantiated attribute being determined to be larger than the size of a second subspace defined by a second instantiation for the at least one uninstantiated attribute; and a processor for determining whether to disregard the first instantiation, the second instantiation being a candidate for the selected instantiation when the first instantiation is disregarded.

25. The system of claim 24 wherein the at least one uninstantiated attribute comprises one or more numeric attributes, and m equals the number of the numeric attributes.

26. The system of claim 24 wherein the at least one uninstantiated attribute comprises one or more categorical attributes.

27. The system of claim 24 wherein the processor determines to disregard the first instantiation based on at least whether the second subspace is contained in the first subspace.

28. The system of claim 24 further comprising means for computing a confidence measure of a given instantiation, wherein the selected instantiation is required to have a confidence measure at least as high as that of the first instantiation and that of the second instantiation, the processor determining to disregard the first instantiation based on at least whether the confidence measure of the second instantiation is at least that of the first instantiation.

29. The system of claim 28 further comprising means for computing a support measure of the second instantiation, wherein the support measure is at least a predetermined value greater than zero.

30. A method for processing data based on an association rule including at least one uninstantiated attribute of the data, the method comprising the steps of:

assigning weights to a plurality of instantiations for the uninstantiated attribute, each weight being assigned to a respective one of the plurality of instantiations, each instantiation being positioned in an array based on the weight assigned thereto; and selecting a subset of instantiations in the array.

31. The method of claim 30 further comprising the step of computing a confidence measure of each of the plurality of instantiations, wherein the weight assigned to the instantiation is a function of at least the confidence measure of the instantiation.

32. The method of claim 30 further comprising the step of computing a support measure of each of the plurality of instantiations, wherein the weight assigned to the instantiation is a function of at least the support measure of the instantiation.

33. The method of claim 30 wherein the instantiations are positioned in the array in decreasing order by weight.

34. The method of claim 30 wherein the uninstantiated attribute comprises a categorical attribute.

35. The method of claim 30 further comprising the step of maintaining a set of instantiations from the array, wherein the subset of instantiations is selected from the set of instantiations, the set being extended to include at least one additional instantiation in the array based on at least one value which is a function of the selected subset of instantiations.

36. The method of claim 35 further comprising the step of computing a confidence measure of the selected subset of instantiations, wherein the value includes the confidence measure.

37. The method of claim 35 further comprising the step of computing a support measure of the selected subset of instantiations, wherein the value includes the support measure.

38. The method of claim 30 further comprising the step of computing a confidence measure of a given subset of instantiations from the array, wherein the number of the instantiations in the selected subset is at most k, where k is greater than zero, the selected subset of instantiations having a relatively high confidence measure with respect to that of any other subset having at most k instantiations from the array.

39. The method of claim 38 further comprising the step of computing a support measure of the selected subset of instantiations from the array, wherein the support measure is at least a predetermined value greater than zero.

40. The method of claim 30 further comprising the step of computing a support measure of a given subset of instantiations from the array, wherein the number of the instantiations in the selected subset is at most k, where k is greater than zero, the selected subset of instantiations having a relatively high support measure with respect to that of any other subset having at most k instantiations from the array.

41. The method of claim 40 further comprising the step of computing a confidence measure of the selected subset of instantiations, wherein the confidence measure is at least a predetermined value greater than zero.

42. A method for processing data based on an association rule including at least one uninstantiated attribute of the data, a set of instantiations being selected for the uninstantiated attribute based on the data, the method comprising the steps of:

deriving from the data at least a first intermediate set and a second different intermediate set of instantiations for the uninstantiated attribute, the number of instantiations in the second intermediate set being at least the number of instantiations in the first intermediate set; and determining whether to disregard the second intermediate set, the first intermediate set being a candidate for the selected set when the second intermediate set is disregarded.

43. The method of claim 42 wherein the uninstantiated attribute comprises a categorical attribute.

44. The method of claim 42 further comprising the step of computing a confidence measure of a given set of instantiations, wherein the s elected set of instantiations is required to have a confidence measure at least as high as that of the first intermediate set and that of the second intermediate set, a determination to disregard the second intermediate set being based on at least whether the confidence measure of the first intermediate set is at least that of the second intermediate set.

45. The method of claim 44 further comprising the step of computing a support measure of the selected set of instantiations, wherein the support measure is at least a predetermined value greater than zero.

46. The method of claim 42 further comprising the step of computing a support measure of a given set of instantiations, wherein the selected set of instantiations is required to have a support measure at least as high as that of the first intermediate set and that of the second intermediate set, a determination to disregard the second intermediate set being based on at least whether the support measure of the first intermediate set is at least that of the second intermediate set.

47. The method of claim 46 further comprising the step of computing a confidence measure of the selected set of instantiations, wherein the confidence measure is at least a predetermined value greater than zero.

48. A method for processing data based on an association rule including at least one uninstantiated attribute of the data, an instantiation being selected for the at least one uninstantiated attribute based on the data, the method comprising the steps of:

determining a size of subspace defined by an instantiation for the at least one uninstantiated attribute, the subspace being disposed in an m-dimensional space, where m is not greater than the number of the at least one uninstantiated attribute, the size of a first subspace defined by a first instantiation for the at least one uninstantiated attribute being determined to be larger than the size of a second subspace defined by a second instantiation for the at least one uninstantiated attribute; and determining whether to disregard the first instantiation, the second instantiation being a candidate for the selected instantiation when the first instantiation is disregarded.

49. The method of claim 48 wherein the at least one uninstantiated attribute comprises one or more numeric attributes, and m equals the number of the numeric attributes.

50. The method of claim 48 wherein the at least one uninstantiated attribute comprises one or more categorical attributes.

51. The method of claim 48 wherein a determination to disregard the first instantiation is based on at least whether the second subspace is contained in the first subspace.

52. The method of claim 48 further comprising the step of computing a confidence measure of a given instantiation, wherein the selected instantiation is required to have a confidence measure at least as high as that of the first instantiation and that of the second instantiation, a determination to disregard the first instantiation being based on at least whether the confidence measure of the second instantiation is at least that of the first instantiation.

53. The method of claim 52 further comprising the step of computing a support measure of the second instantiation, wherein the support measure is at least a predetermined value greater than zero.

54. The method of claim 48 further comprising the step of assigning a weight to the second instantiation when the first instantiation is disregarded.

55. The method of claim 54 wherein the second instantiation is positioned in an array based on the weight assigned thereto.

* * * * *